April 14, 1931.  B. TEICHMANN  1,801,124
DYNAMOELECTRIC MACHINE
Filed June 7, 1929
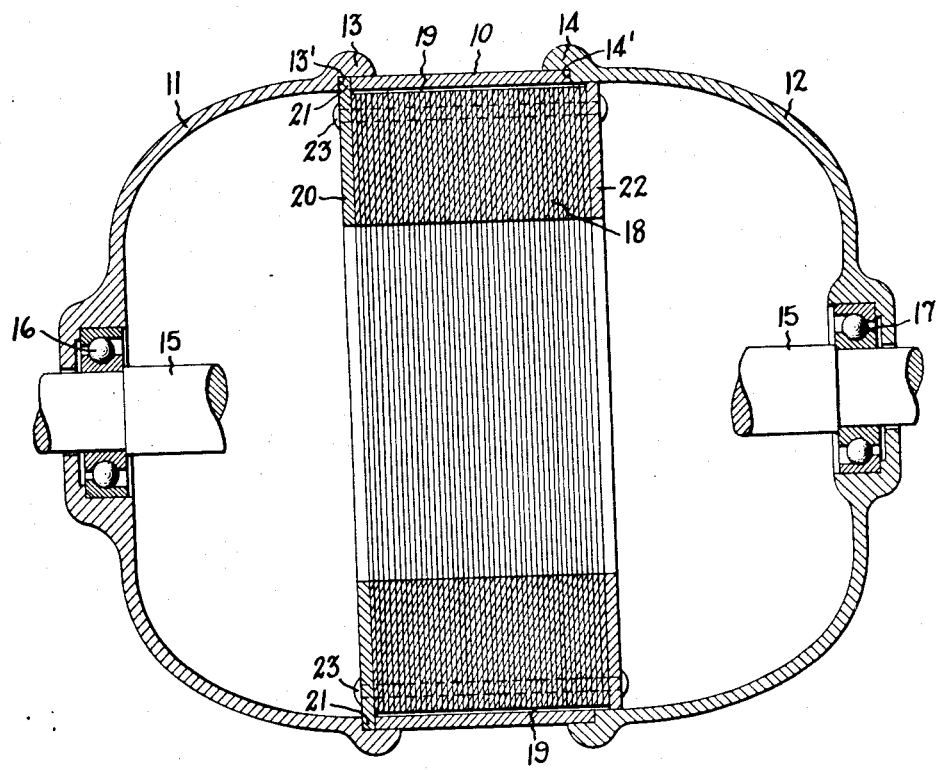
Inventor:
Bruno Teichmann,
by Charles E. Tullar
His Attorney.

Patented Apr. 14, 1931

1,801,124

UNITED STATES PATENT OFFICE

BRUNO TEICHMANN, OF BERLIN, GERMANY, ASSIGNOR TO GENERAL ELECTRIC COMPANY, A CORPORATION OF NEW YORK

DYNAMO-ELECTRIC MACHINE

Application filed June 7, 1929, Serial No. 369,167, and in Germany September 14, 1928.

My invention relates to small dynamo-electric machines.

In making the stationary members of small dynamo-electric machines, it has been the practice to fit a core structure in a shell and secure end-heads to the shell for supporting the bearings of the rotatable member of the machine. In order to accurately aline the core structure with the axis of the rotatable member, it has been necessary to bore out, or otherwise accurately form the shell to receive the core structure. In some cases the shell has been omitted, and the end-heads have been fitted directly to the core structure, but this is subject to the disadvantage that it necessitates making the core structure accurate in length so as to obtain the exact distance required between the bearings of the rotatable members of the machine in the end-heads.

The object of my invention is to provide a construction of the stationary members for small dynamo-electric machines such that the length and outside diameter of the core structure are not required to be exact. I accomplish this by providing a stationary member including frame members having a core structure therein, a portion of the core structure being of larger diameter than the inside of said frame members and extending between the frame members for supporting the core structure therein. By this construction I am enabled to reduce the amount of accurate finishing of the parts of the stationary member and thereby effect a substantial economy in the cost of the construction of the stationary member.

As an example of one manner of carrying out my invention, I have illustrated in the drawing a longitudinal section of the stationary member of a small dynamo-electric machine embodying my invention.

In the construction illustrated, the stationary member of the machine includes frame members in which the core structure of the machine is arranged. These frame members comprise a shell 10 having end-heads 11 and 12 which are flanged at 13 and 14 respectively so as to fit on the shell 10 and are formed with internal shoulders 13' and 14'. The shaft 15 of the rotatable member is arranged in bearings 16 and 17 in the end-heads, and the frame members are secured together in any convenient manner.

In accordance with my invention the core structure 18 is formed to receive the rotatable member of the machine and is made somewhat smaller in outside diameter than the inside of the shell 10 to provide clearance between them as indicated at 19, so as not to require a high degree of accuracy in the size of the inside diameter of the shell or the outside diameter of the core structure. A portion of the core structure includes a plate 20 which is of slightly larger diameter than the inside diameter of the shell 10, and is preferably of the same diameter as the outside of the shell 10 so that this portion fits inside of the flange 13 and against the shoulder 13' of the end-head 11, as indicated at 21. In the particular construction illustrated the core structure 18 preferably consists of laminations which are punched to receive the usual windings of the stationary member, not shown, and are secured together between plates 20 and 22 by rivets 23 or any other suitable means, the plate 22 and the core structure 18 being loosely fitted in the end-head 12 and shell 10 respectively.

By this construction it will be observed that the accuracy of the dimensions of the frame members of the machine required to obtain the exact distance between the centers of the bearings 16 and 17 in the completed stationary member is minimized. This is due to the fact that the plate 20 can be readily made of the exact thickness required, and the distance from the shoulders 13' and 14' of the end-heads to the bearing centers and the length of the shell 10 can readily be made accurately of any desired dimension. The distance between the centers of the bearings 16 and 17 is the sum of these dimensions, so that it is not difficult to obtain the exact distance required between the centers of the bearings 16 and 17 in the construction of the machine, and the internal diameter of the shell 10 and the external diameter of the core structure 18 is not required to be very accurate because of the clearance indicated at 19 between them.

Moreover, considerable tolerance is permissible in the length of the core structure as one end only is attached to the frame members.

Although I have shown my invention in connection with a stationary member for dynamo-electric machines in which the core structure is supported between the frame members thereof, I do not desire my invention to be limited to the particular arrangement shown and described, and I intend in the appended claims to cover all modifications which do not depart from the spirit and scope of my invention.

What I claim as new and desire to secure by Letters Patent of the United States is:

1. A dynamo-electric machine having a stationary member including a shell and an end-head, and a core structure loosely fitting said shell having a portion at one end thereof of larger diameter than the inside of said shell and arranged between said shell and said end-head for supporting said core structure in said shell.

2. A dynamo-electric machine having a stationary member including a shell and an end-head, a core structure loosely fitting said shell, and means for securing said core structure together including a plate at one end thereof of larger diameter than the inside of said shell and arranged between said shell and said end-head for supporting said core structure in said shell.

3. A dynamo-electric machine having a stationary member including a shell and an end-head having a flange surrounding said shell, and a core structure loosely fitting said shell having a portion at one end thereof of larger diameter than said shell and arranged between said shell and said end-head for supporting said core structure in said shell.

4. A dynamo-electric machine having a stationary member including a shell, end-heads having flanges surrounding said shell, a core structure loosely fitting said shell, and means for securing said core structure in said shell, said means including a plate at one end of said core structure of larger diameter than the inside of said shell and arranged between said shell and one of said end-heads inside of the flange thereof for supporting said core structure in said shell.

In witness whereof, I have hereunto set my hand, this 21st day of May, 1929.

BRUNO TEICHMANN.